United States Patent [19]
Anderson

[11] 3,777,237
[45] Dec. 4, 1973

[54] DIRECT CURRENT POWER CONTROL CIRCUIT

[75] Inventor: Albert W. Anderson, Roanoke, Va.

[73] Assignee: General Electric Company, Salem, Va.

[22] Filed: Mar. 3, 1972

[21] Appl. No.: 231,487

[52] U.S. Cl............. 318/345, 307/252 M, 321/11, 321/44, 321/45 C, 318/373, 318/375
[51] Int. Cl............................................. H02p 5/12
[58] Field of Search .................... 321/2, 43, 11, 44, 321/45 C; 323/DIG. 1; 318/138, 345, 373, 375; 307/252 M

[56] References Cited
UNITED STATES PATENTS
| | | | |
|---|---|---|---|
| 3,573,598 | 4/1971 | Clarke et al. ........................... | 321/2 |
| 3,344,328 | 9/1967 | Morris ............................ | 318/373 X |
| 3,656,039 | 4/1972 | Konrad ............................. | 321/45 C |
| 3,551,769 | 12/1970 | Tedd............................... | 318/373 X |
| 3,555,399 | 1/1971 | Buchanan et al. ..................... | 321/43 |
| 3,629,673 | 12/1971 | Thorborg .......................... | 321/45 C |

*Primary Examiner*—Gerald Goldberg
*Attorney*—Arnold E. Renner et al.

[57] ABSTRACT

A control circuit for controlling the effective power to a load from a power source of substantially constant direct current voltage in which the amount of effective power delivered to the load is controlled by controlling the percentage of time that the load and the power source are interconnected. Included within the system is a switching device preferably of the solid-state type which is alternately placed in the conductive and nonconductive state to vary the percentage of time. Two forms are included, the first being essentially a low power form and the second a dual level type of control system in which it is possible to alternate selectively between two modes of operation to operate the control circuit in a high and low power mode. Also provided is the application of the dual mode system to a direct current motor control system for providing what in the art is known as plugging.

15 Claims, 4 Drawing Figures

DIRECT CURRENT POWER CONTROL CIRCUIT

BACKGROUND OF THE INVENTION

The present invention relates generally to a control circuit for varying the effective power from a direct current source to an appropriate load and more particularly to a control circuit of the type which is known in the art as a DC chopper which control circuit is capable of extremely rapid commutating times and which in a second embodiment is capable of operation in two distinct modes.

It is known in the prior art that the amount of power which can be supplied to a load, for example a direct current motor, from a substantially constant direct current voltage source may be varied by connecting and disconnecting the load to and from the source. The effective amount of power supplied to the load will vary in accordance with the percentage of time that the load and the source are connected. It is also known in the prior art to use a solid-state switching device, which may be switched at a selected frequency to provide this varying amount of power. Solid-state switching device normally used in applications of this nature is known as a thyristor; the most common of which is a silicon controlled rectifier described in "SCR Manual, 4th Edition" by General Electric Company, Copyright 1967 by General Electric Company. Thyristors are rendered conductive by the simultaneous application of a forward voltage bias and a gating signal. Once conduction is established the gating signal may be removed and conduction will continue until a zero or negative voltage bias is applied to the thyristor terminals. One example of motor control circuit embodying the type of control just described is found in U.S. Pat. application, Ser. No. 73,724, "Direct Current Control Circuit" by A. W. Anderson et al., filed Sept. 21, 1970 and assigned to the assignee of the present invention. In this application, the motor is controlled through a main thyristor, specifically a silicon controlled rectifier (SCR), which is gated to the on or conductive state by the application to its gating terminal of a pulse from the variable frequency oscillator. This thyristor is rendered nonconductive by way of energy stored in a suitable commutating capacitor which is allowed to discharge in the direction opposite to that to which the thyristor normally conducts. A second circuit of this general type is described in U.S. Pat. application, Ser. No. 176,569, "Direct Current Control Circuit" by A. W. Anderson et al., filed Aug. 31, 1971 and assigned to the assignee of the present invention. A third and similar control circuit of this nature is found in British Pat. No. 1,186,363, complete specification published Apr. 2, 1970.

There are, of course, numerous other DC choppers known in the art with the three specifically identified above differing from that which is more common in that in each case the commutating capacitor is provided with a separate path by which its charge may be reversed. This path is independent of the main or power thyristor which is gated to connect the load to the source as was described above and it is with respect to this particular system that the present invention, particularly its second embodiment, finds primary application. While each of the three circuits identified above operates satisfactorily in most aspects, they all suffer from one deficiency in that the conducting time of the power thyristor is normally fairly long. This is primarily because of the high currents which are present in the operation of the circuit and because of the overall circuit inductance which must be overcome in discharging the capacitor or storage means in a direction such as to commutate the power thyristor. Thus, in circuits known in the art, when the power requirements of the load are small it is necessary to gate the power thyristor on at a relatively low frequency such that the average power is of the desired value. This, of course, results in a current of high ripple content which is undesirable in many instances. Additionally, in the case of a series direct current motor acting as a generator, very high peak currents may result which may be detrimental for reasons such as arcing at the brushes.

It is further known in the prior art that a DC motor can be used to provide a braking action by what is commonly referred to as plugging. In plugging, the armature and field windings of the motor are connected in a manner such that the current from the source passes through one of these windings in a direction relatively opposite to that existing when the motor is operating in a driving or traction mode. This is usually achieved by reversing either the armature or field connections with the latter being more common. In the plugging situation, power delivered to the motor from the source will tend to drive the motor in a direction opposite to that of existing rotation to thus achieve a braking action. The amount of braking achieved by this method is dependent upon the amount of power delivered from the source to the motor.

Known circuits such as have been described above have been utilized to achieve the plugging function in a motor control circuit. The main problem prevalent with these circuits in the plugging operations stems from the earlier described use of the same switching device, hereinafter referred to as the main or power thyristor for energizing the motor in both the traction mode and the braking mode. It is also recognized that the amount of braking achieved by plugging a motor is a function of the average power supplied to the motor. Normally, the amount or power desired in a plugging situation is considerably less than that required when the motor is driving or serving in the traction mode. Thus, in order to achieve the desired power level during plugging, the main thyristor must be pulsed at the low frequency, resulting in a pulsating braking action as well as increased peak currents and possible arcing at the brushes earlier described.

It would, of course, be possible to employ the power in an entirely independent control for supplying power to the motor or for governing the conduction period of the power thyristor. Such an independent control would, however, seriously increase the overall cost of the system.

SUMMARY OF THE INVENTION

The foregoing deficiencies of the prior art are alleviated by the control system of the present invention which provides the ability for commutating the power carrying device a very short period of time after conduction is initiated. This is achieved in accordance with the present invention by providing a circuit which does not depend upon reversing the charge on the commutating capacitor during its conducting period in which the charge is reversed during that period of time in which the power switching device is in a nonconducting state, thus permitting a more rapid reversal of the charge on the capacitor. In a second embodiment, the present invention constitutes an incorporation of the first embodiment into the general type of circuit which has been described previously known in the art with the further inclusion of means such that the overall control circuit may be selectively operated in either of two modes. These modes are, relatively speaking, a high power mode and a low power mode. This is achieved in accordance with the present invention by using the same control means for both modes thus providing an extremely economical and versatile system.

It is, therefore, an object of the present invention to provide an improved control circuit for varying the power supplied from a direct current source to a load.

A further object is to provide a control circuit which permits the application, to a load, of pulses from a DC source of relatively short duration and high frequency.

It is a further object to provide a control circuit which is operable in two distinct modes which are, relatively speaking, of high and low power.

It is a still further object to provide a control circuit for a direct current motor in which the power supplied thereto is selectively variable within a wide range.

It is an additional object of the present invention to provide a control circuit for a direct current motor which circuit provides optimum operation of the motor both in the traction and in the plugging modes.

DESCRIPTION OF THE DRAWINGS

The foregoing and other objects of the present invention will become apparent as the following description proceeds and features of novelty which characterize the invention will be pointed out in particularity in the claims annexed to and forming a part of this specification. For a better understanding of the invention, reference is made to the accompanying drawings in which:

DETAILED DESCRIPTION

Figure 1:
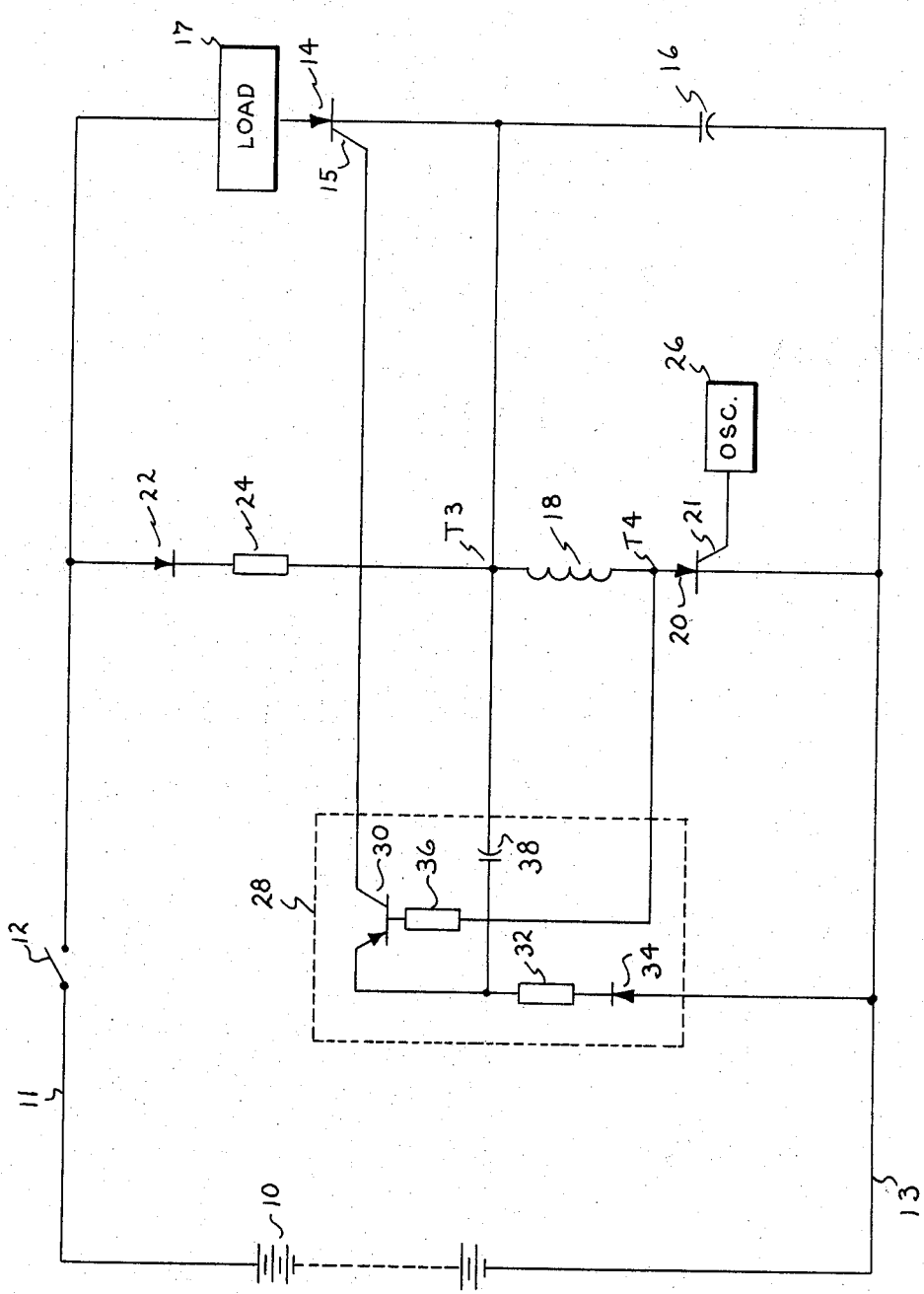
FIG. 1 is a schematic drawing illustrating the present invention in its first embodiment.

Referring now to FIG. 1, there is shown a suitable source of direct current power 10 illustrated as a battery disposed with its positive terminal at the top to a positive bus 11 and its negative terminal at the bottom to a negative bus 13. A master switch 12 serves to connect and disconnect the source from the rest of the circuit. In a series loop with the battery is a load 17, a first switching device 14 (illustrated in the form of a thyristor) and a capacitor 16. The thyristor 14 includes a gate terminal 15. Connected in parallel with capacitor 16 is a series combination of an indicator 18 and a second thyristor 20 having a gate terminal 21 such that the capacitor 16, the inductor 18, and the thyristor 20 form a series loop. The capacitor charging path, comprised of a diode 22 poled to conduct current from the positive bus 11 and a current limiting resistor 24 connects the positive bus 11 to the upper plate of the capacitor 16 to initially charge that capacitor with its top plate positive for reasons to be more fully explained hereinafter.

Thyristor 20 is rendered conductive, or gated to the on state, by means of a suitable pulse generating means indicated generally by a block 26 labeled oscillator. The oscillator 26 may be of any suitable type but normally is of a standard relaxation type such as will be explained, in the simplified version, in greater detail with respect to FIGS. 2 and 3. Gating for the thyristor 14 is provided by the circuitry shown within dot line box 28. This gating circuitry includes a transistor 30 having its collector connected to the gate electrode 15 of thyristor 14 and its emitter connected to the negative bus 13 via a current limiting resistor 32 and a diode 34 which is poled to conduct current from the negative bus 13 to the emitter of the transistor 30. The base of the transistor 30 is connected through a resistor 36 to the junction point of the inductor 18 and the anode of thyristor 20. A capacitor 38 is connected between the emitter of the transistor 30 and the junction of resistor 24, conductor 18, and the cathode of thyristor 14.

The operation of the circuit shown in FIG. 1 is as follows. With the closing of switch 12 power is supplied from the battery 10 to the positive bus 11 and current flows through the diode 22 and the resistor 24 charging capacitor 16 positive at the top plate to battery voltage. The oscillator 26 is now rendered operative and with the first pulse from the oscillator 26 applied to the gate electrode 21, thyristor 20 will be rendered conductive and the charge on capacitor 16 will reverse resonantly through the circuit from the top plate of the capacitor 16 through the inductor 18 and the thyristor 20 such that the charge on the capacitor 16 will be reversed with its lower plate positive and its upper plate negative. The positive voltage on the lower plate of capacitor 16 which will be approximately that of battery voltage (it may be slightly higher due to the inductive effect of the circuit) reverse biases thyristor 20 and renders it nonconductive. At the same time, capacitor 38 of the control circuit 28 will be charged with its right-hand plate negative, corresponding to the charge on capacitor 16, and its left-hand plate or that plate connected to the emitter of the transistor 30 will be charged positively. When thyristor 20 is rendered nonconductive or is turned off, the voltage across the inductor 18, that is the voltage from the lower terminal T4 to the upper terminal T3, reduces towards zero thus pulling the base of transistor 30 down through resistor 36 making transistor 30 conductive and permitting the charge on capacitor 38 to be applied to the gate electrode 15 of thyristor 14 turning that thyristor on. With thyristor 14 conducting, the power path including the battery 10, the switch 12, the load 17, the thyristor 14 and the capacitor 16 is completed and the power may flow from the upper terminal of the battery through the load 17. It is noted that at this time that the charge on the capacitor is in an aiding relationship with respect to battery voltage. This current will flow through the load until such time as the charge on the capacitor 16 reverses to become positive at the top at which time the charge on the capacitor 16 reversely biases the thyristor 14 to render it nonconductive. Thus, one complete cycle of the chopper of the present invention has been completed. With the next pulse from the oscillator 26, the thyristor 20 is again rendered conductive and the cycle repeats. It should be noted that for subsequent cycles the initial charging path of the diode 22 and the resistor 24 are ineffective, their sole function being to provide initial charge necessary on the capacitor for the first cycle of operation.

From the foregoing description it is seen that the control circuit just described is capable of delivering extremely narrow pulses of power from the battery to the load in that the charge on the capacitor is reversed during the nonconduction period of what is, in this instance, the power thyristor 14. The pulse width is essentially determined by the RC time constant of the series circuit. Because of the relatively narrow pulse width (in one particular application, about 200 microseconds) achieved by the circuit of the present invention, the frequency of the cycle, which is determined by the frequency from the oscillator 26, may be fairly high while yet retaining a relatively low power level applied to the load. Thus the current will have a low ripple content and will not, due to circuit inductance, reach high peak values.

Figure 2:
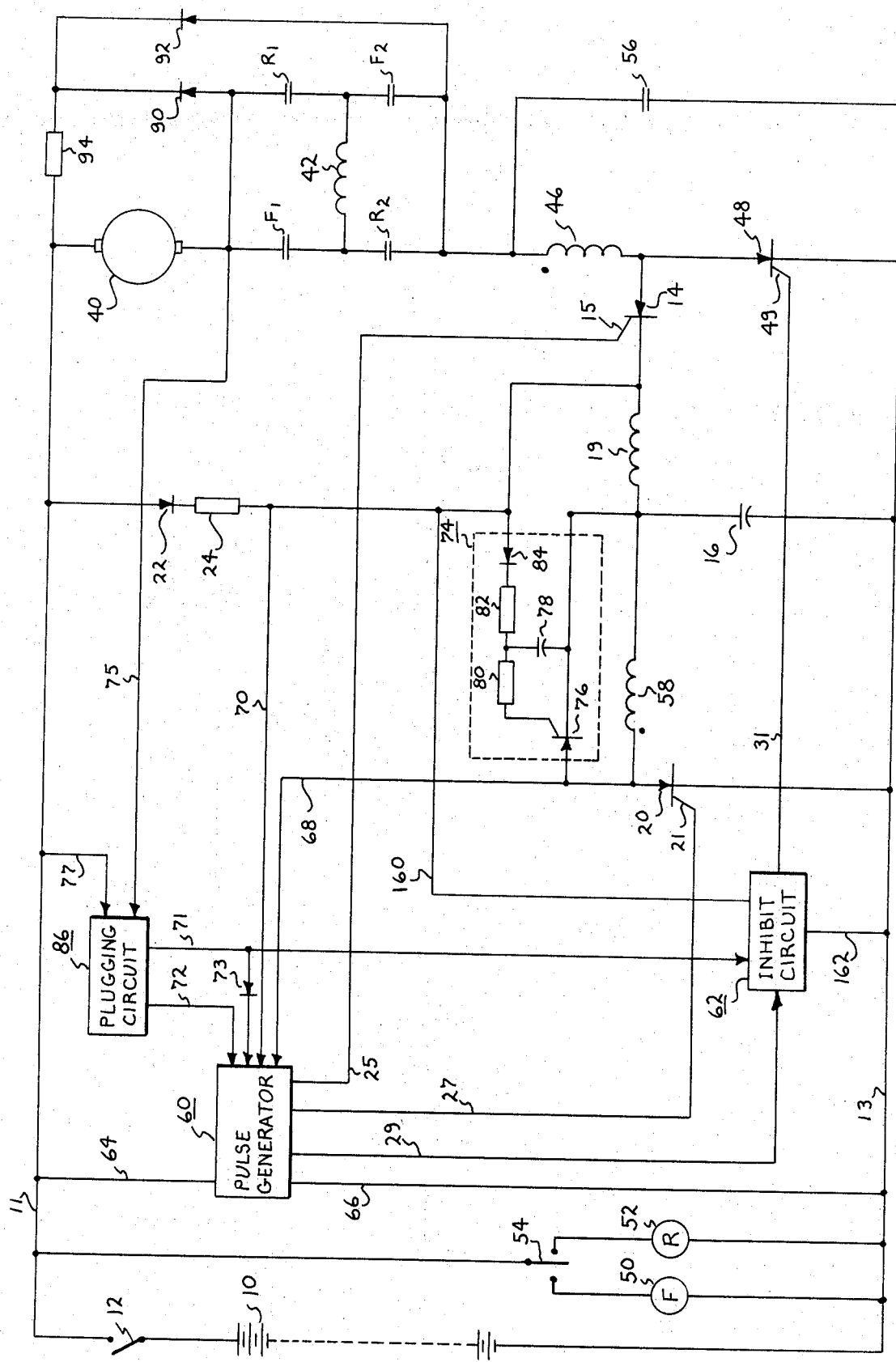
FIG. 2 is a schematic drawing illustrating the present invention in its second embodiment as applied to a motor control circuit employing braking action by plugging.

Referring now to FIG. 2 there is shown the present invention incorporated within a control of the general type as set forth in the aforementioned patent application, Ser. No. 73,724 to Anderson et al. and in which the invention is incorporated within a system employing the dual power level. The depiction of FIG. 2 is shown with respect to a motor control circuit in which there is provided the facility of plugging the motor, although as will become apparent, this embodiment is illustrative only. Insofar as is practical, like identification characters have been applied to the components of FIG. 2 as were used with respect to FIG. 1.

Referring now to FIG. 2, there is again shown a battery 10 connected to a positive bus 11 by switch 12. In a series loop with the battery is the load which in this case is a series direct current motor having an armature 40 and a field winding 42. The direction of the current through the field winding 42 is governed by the relative condition of four contacts F1, F2, and R1, R2 as will be hereinafter described. Completing the series loop is a transformer primary 46 and a solid-state switching device 48 (illustrated as a thyristor having a gate electrode 49) connected with its anode to the free side of the transformer primary and its cathode to the negative terminal of the battery 10.

The direction of current through the motor field winding 42, and hence the direction of torque resulting from applied power, is determined by two pairs of switch contacts F1, F2, and R1, R2. Upon closure of the F1 and F2 contacts, current from the source 10 will flow in the winding 42 in a first direction (left to right) while actuation of contacts R1 and R2 will result in the flow of current from the source 10 in the opposite direction, that is from right to left as illustrated. Operation of the contact pairs F1, F2 and R1, R2 is under respective control of an F coil 50 and an R coil 52, each of which may be selectively connected across the battery 10 by means of a selection switch 54. The F and R designations indicate respectively the arbitrary selection of forward and reverse directions of the motor torque from power applied to the motor.

In the high power mode of operation of the present invention, thyristor 48 is the main power thyristor and during operation of the motor the effective power delivered thereto, in either the forward or reverse direction, is governed by the ratio of on time to off time during which the thyristor 48 is in its conductive state. Connected across the transformer primary 46 and the thyristor 48 is a short-circuiting contactor 56 which, when closed, serves to place the motor directly across the battery 10 to provide maximum power to the motor in a manner well-known in the art.

In parallel with thyristor 48 is a series connection of the thyristor 14, a choke 19 and the capacitor 16. In the high power mode of operation, these elements serve as the commutating circuit for thyristor 48. Thyristor 14 is connected anode to anode with thyristor 48. As before, the cathode of thyristor 14 is connected to the upper plate of the capacitor 16 which is also connected to the positive bus by way of diode 22 and resistor 24. The lower plate of the capacitor is connected to the negative bus 13.

The charge reversing circuit includes a transformer secondary 58 (corresponding to inductor 18 of FIG. 1) and the thyristor 20 connected in parallel with the capacitor 16. In the embodiment illustrated, the primary 46 and secondary 58 are separate windings, inductively coupled although they may also be independent inductances.

When a transformer is used, however, it is desirable to place a clamping circuit around the secondary such as is illustrated in FIG. 2 at 74. This clamping circuit includes a thyristor 76 connected in parallel with the secondary 58. A series arrangement of a capacitor 78 and a resistor 80 is connected in a cathode to gate circuit of the thyristor 76 while a diode 84 in series with a resistor 82 is connected in parallel with the capacitor 78. This clamping circuit serves to suppress any positive going voltage spike or transient appearing at the cathode of thyristor 14.

The gating connections 15, 21, and 49 of the thyristors 14, 20, 48, respectively, are connected by leads 25, 27, 29 and 31 to a pulse generator 60, shown in FIG. 2 in block form, the details of which will be described in greater detail with respect to FIG. 3. (It is noted that the gate 49 of thyristor 48 is shown connected to the pulse generator 60 by way of an inhibit circuit 62. Inhibit circuit 62, whose function is described hereinafter and the details of which are explained with respect to FIG. 4, plays no part in the operation of the present control during the high power mode and may, for this mode be considered as a short circuit.) Pulse generator 60 is supplied with power via leads 64 and 66 which are connected respectively to the positive and negative buses. Additional inputs to the pulse generator 60 include leads 68 and 70 which are connected respectively to the opposite terminals of the transformer secondary 58 for providing input signals to the pulse generator 60 as will be hereinafter described. The last two inputs 72 and 74 to the pulse generator 60 are from a plugging circuit 86 which will be described with respect to the plugging function of the system of the present invention.

Before proceeding with a detailed description of the circuit operation, it is believed advantageous to state that the transformer flux convention to be used in this discussion is that of a positive flux generation from current into the polarity dot and negative flux generation from current out of the polarity dot.

Assume first, for purposes of this discussion, that this is an initial operation and that there is no residual charge on the capacitor 16 and that all of the thyristors are in the nonconductive state. With the closing of the switch 12, power is supplied from the battery 10 via bus 11 and leads 64 and 66 to the pulse generator 60 and to the capacitor 16 by way of diode 22 and resistor 24 allowing capacitor 16 to charge to battery voltage with its upper plate positive. Selector switch 54 is now actuated to either the F or R position to operate the appropriate contacts with respect to the field winding 42. For purposes of this illustration, it is assumed that the switch 54 is positioned to the left, thus energizing the F coil 50 and closing contacts F1 and F2. Inasmuch as all of the thyristors are still in the nonconductive state, however, no current will exist through the motor at this time. A pulse is now supplied by the pulse generator 60 to thyristor 48 via gate 49 to gate thyristor 48 on. After a short delay, by way of gate 21, thyristor 20 is rendered conductive. At this instant in time, a voltage very nearly equal to the battery voltage is applied across the motor armature 40 and field 42 resulting in a motor current whose rate of increase is determined almost entirely by the motor inductance and resistance. (In the event the motor is turning because of prior operation the generated voltage of the motor will also affect the rate of motor current increase.)

Because thyristor 20 is now conductive, the charge on capacitor 16 (positive at the top plate) will generate a current through the transformer secondary 58 and will drive the transformer toward negative saturation. (It will be remembered that, by definition, negative flux was defined as current out of the polarity dot.) When transformer reaches negative saturation and its impedance is essentially that of an air core inductance, the current in the loop comprising the capacitor 16, transformer secondary 58 and thyristor 20 will rise sharply and resonantly reverse the remaining initial capacitor charge resulting in a capacitor charge which is positive at the lower plate. By this time the load (motor) current will have increased in vlaue and its passage through the transformer primary winding 46 will drive the transformer toward positive saturation. As the transformer moves toward positive saturation, the voltage across the secondary 58 which is positive at the dot, will force the existing charge on the capacitor (now positive on lower plate) to a higher value. The charge on the capacitor at this period of time of circuit operation normally exceeds battery voltage with the lower plate being positive.

When, due to the load current, the transformer saturates in the positive direction, the voltage induced across the secondary 58 will collapse and the capacitor 16 will attempt to neutralize its charge by forcing a reverse current through the thyristor 20 in the reverse direction (clockwise). This biasing of thyristor 20 will commutate (turn off) its conduction and the thyristor will be rendered nonconductive. The reversal of the voltage across the transformer secondary 58 which occurs in that a small amount of time during which current flows in a clockwise direction is sensed, via lead 68 and 70, by the pulse generator 60 which in response thereto develops a pulse which is applied to the gating connection 15 of thyristor 14 placing that thyristor in the conductive state. The voltage on the capacitor 16 (positive at bottom plate) is now impressed across the thyristor 48 in a direction opposite to its conduction thus forcing the anode of that thyristor to zero and rendering it nonconductive.

When thyristor 48 ceases to conduct, the load or motor current is diverted through thyristor 14 and the commutating capacitor 16. The load inductance plus the air core inductance of the saturated transformer primary 46 forms an under-damped circuit which will cause the capacitor to ring resonantly such that the capacitor is charged above battery voltage (positive to top plate). Because the charge on the capacitor 16 exceeds and opposes the battery voltage the capacitor will attempt to discharge back through the commutating thyristor 14 forcing its cathode positive and causing the thyristor 14 to cease conduction.

The system has now completed one complete power cycle and the pulse generator 60 will provide the next pulses to thyristors 48 and 20 to initiate the subsequent cycle. As indicated, the timing of the next cycle is dependent upon the desired amount of power to be supplied to the load. In the situation of a motor load; for example, as an electric vehicle, the pulse frequency and/or width would be determined through a speed control mechanism.

During the interpulse period, when battery power is not supplied to the motor, the current of the motor due to generated voltage will be divered through a pair of rectifiers (diodes) 90 and 92 connected, respectively, as follows. A resistor 94 is connected to the upper terminal of motor armature 40, the other end of the resistor 94 being connected to cathodes of the diodes 90 and 92. The anode of diode 90 is connected to the other terminal of the armature 40 while the anode of the diode 92 is connected to the free end of the field 42. Thus, when the motor is deenergized with respect to the source 10, diode 90 carries the armature current minus the field current while diode 92 carries the field current. In general, when a series motor is driven as a motor, the armature and the field currents are of the same magnitude and diode 90 does not conduct. During periods of nonpower application to the motor, the motor current will begin to decay on the natural time constant of the field and the armature. During normal operation, however, the frequency of power application is great enough compared to the time constant of the motor that the amount of motor current decay is small, thus minimizing ripple components.

The system is now in condition for the second pulse operation which will be substantially that as described with a few minor differences. Specifically, at the next gating of the thyristor 48, the commutating capacitor will be charged above battery potential (assuming there has not been sufficient time between adjacent pulses to allow the capacitor to discharge completely to battery voltage). In this situation, when the thyristor 48 is again gated its anode current will rise almost instantly to the level of motor current, allowing the motor current to build up to a higher value than previously achieved and resulting in a somewhat higher commutating voltage being developed on the commutating capacitor 16 when the lower plate is positive. Upon subsequent cycles these changes will continue until a steady state condition is reached and which is determined by several variables including the vehicle speed, the pulse width and the pulse rate as applied to the thyristor 48.

Thus there has been described the high power mode of the present invention, In this mode the pulses of power delivered to the load are of relatively wide duration. For example, in control embodying this circuit used on electric fork lift trucks the pulse width resulting from the use of the thyristor 48 as the power switching device averages about 2 milliseconds.

Figure 3:
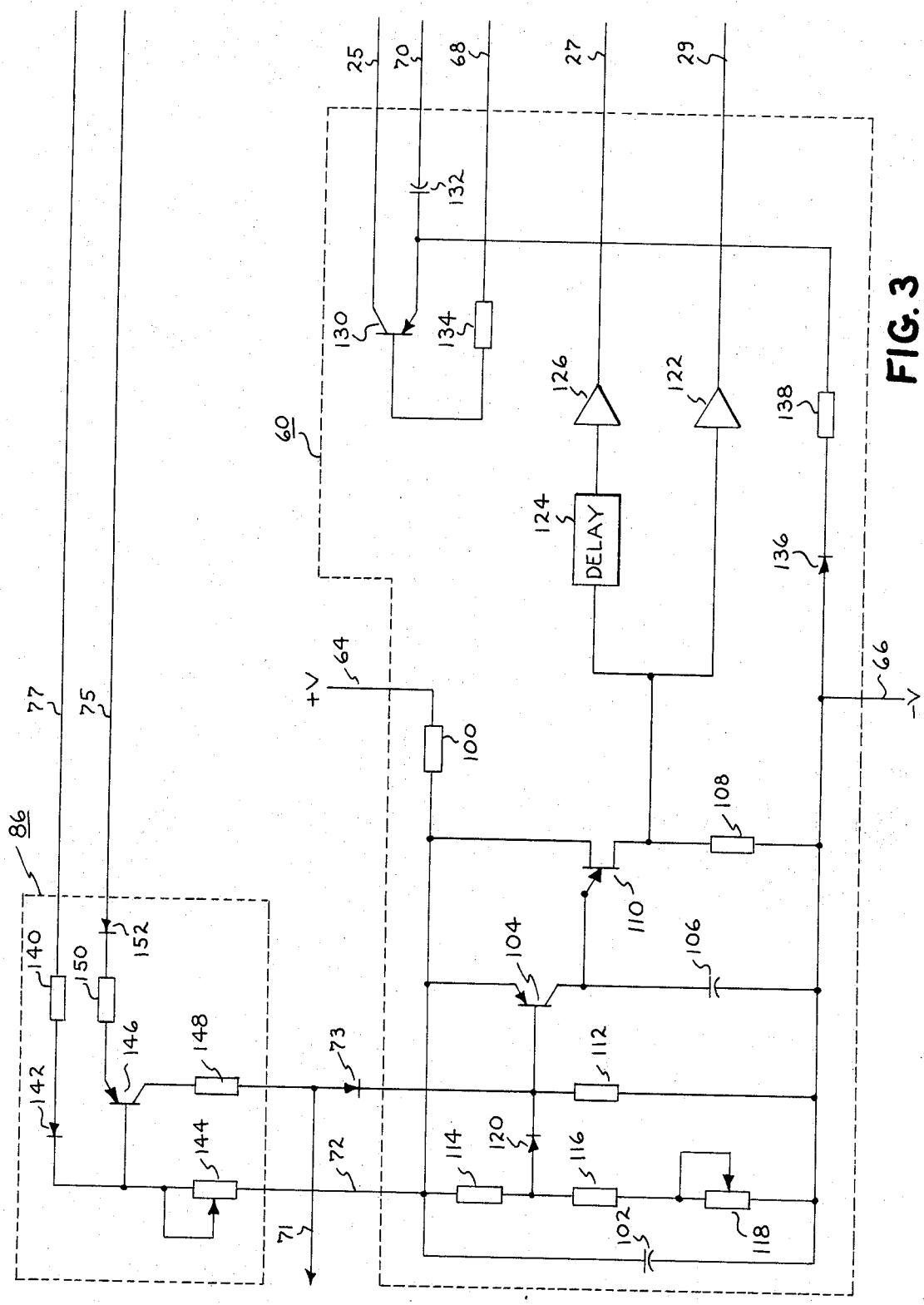
FIGS. 3 and 4 are detailed schematic drawings of certain elements of FIG. 2 illustrated therein in block form.

Referring now to FIG. 3, there is shown in greater detail the pulse generator 60 and plugging circuit 86 illustrated in block form in FIG. 2. For purposes of simplicity, inasmuch as the details of these two circuits do not form a direct part of the invention, these elements are shown in their basic form to provide the essential functions necessary to the proper operation of the circuit of the present invention. In FIG. 3 connection 64, coming from the positive bus 11 leads to a resistor 100 in series with a capacitor 102. These two elements collectively form a power supply to provide a voltage lower than battery voltage for the pulse generator. The other side of capacitor 102 is connected via line 66 to the negative bus 13. The heart of the pulse generator, that which provides the gating signal for the thyristors 20 and 48 (FIG. 2) is an oscillator of the relaxation type (corresponding to 26 of FIG. 1) which comprises a transistor 104, a capacitor 106, a resistor 108 and a unijunction transistor 110. This relaxation oscillator is of the variety known in the art with the emitter of the transistor 104 being connected to the low voltage side of resistor 100 and its collector forming the base input to the unijunction transistor 110. The other two connections to the unijunction transistor 110 are to the junction of the emitter of the transistor 104 with the resistor 100 and to resistor 108, the other side of which joins to the negative bus.

The pulse rate of a relaxation oscillator such as that illustrated is a linear function of the collector current of the transistor 104. This current is governed by the voltage appearing across a resistor 112 connected between the transistor base and the negative bus. The voltage across resistor 112 is in turn controlled by two fixed resistors 114, 116, and a variable resistor 118. In the case of an electric vehicle, resistor 118 would be actuated by the accelerator control of the vehicle. Resistors 114, 116, 118 collectively form a voltage divider with the resistor 112 being in parallel with the two resistor 116 and 118 and connected thereto by means of a rectifier 120 which joins the union of resistors 114 and 116 to the common junction of the base of the transistor 104 and the resistor 112.

The output of the relaxation oscillator is taken from a terminal of the unijunction transistor 110 and passed through a suitable amplifier 122, the output of which is applied, via line 29, inhibit circuit 62 and line 31, as a gating signal to the gate 49 of thyristor 48. (It will be remembered that in the high power mode of operation that the inhibit circuit 62 acts as a short circuit.) The same output from the unijunction transistor 110 is also passed through a suitable delay 124, the output of which forms an input to a second amplifier 126, the output of which is applied to the gating connection 21 of thyristor 20. The amount of time provided by the delay 124 will, of course, be dependent upon the various parameters of the entire system but in practice it is normally about 10 microseconds. In any case, the time delay is sufficient to insure that thyristor 48 is fully conductive before thyristor 20 is gated to the conductive condition.

Also included within the pulse generator 60 is a gating circuit for the thyristor 14 (FIG. 2). As shown in FIG. 3, this gating circuit is comprised of a transistor 130, the collector of which is connected to the gating connection 15 of thyristor 14. The emitter of transistor 130 has an input via line 70 by way of a capacitor 132. Line 70 is connected to the cathode of thyristor 14 as shown in FIG. 2. Line 68 which is connected to the other side of the transformer secondary 58 provides a signal applied through resistor 134 to bias the base of transistor 130. A rectifier 136 and a limiting resistor 138 serve to join the emitter of the transistor 130 to the negative bus by way of line 66.

In operation when the transformer is saturating in the positive direction as previously explained, a current path is established from the left side of the secondary 58 through thyristor 20 to the negative bus of this system (FIG. 2) through the diode 136, resistor 138, capacitor 132 and through lead 70 to the right side of the secondary 58. This current charges capacitor 132 in a direction such that that plate (left plate in FIG. 3) connected to the emitter of transistor 130 is positive. When the transformer saturates and the voltage across the secondary collapses with the resultant tendency of reverse current therethrough as previously explained, capacitor 16 (FIG. 2), which at this time is charged with its lower plate positive, will act as a voltage source. Current from this source will flow through the diode 136 and resistor 138 establishing an emitter to base current within transistor 130. This emitter to base current flows through resistor 134, line 68, and the transformer secondary to the upper plate of capacitor 16. Transistor 130 is thus rendered conductive and the charge on capacitor 132 will supply a collector current or signal which is applied to the gate 15 of thyristor 14 to render that thyristor conductive. It is noted that this portion of the circuit is substantially identical to the control circuit 28 of FIG. 1.

For a better understanding of the braking operation as it is employed to illustrate the present invention, reference is first made to FIG. 2 in conjunction with the more detailed showing of the plugging circuit 86 as shown in FIG. 3. It will be initially assumed that the truck is driving in the forward direction such that the contactors F1 and F2 are closed and contactors R1 and R2 open and that thyristor 48 conducting as previously described. At this time current will be from the positive terminal of the battery 10, through the motor armature 40, from left to right through the field winding 42, then through the transformer primary 46 and the thyristor 48 to the negative side of the battery. Under these conditions the voltage generated by the armature conductors cutting the lines of field flux is positive at the upper terminal of the armature. If it is now desired to decelerate or to brake (plug) the motor, switch 54 is moved to connect the R coil 52 across the battery, thus opening contacts F1, F2 and closing contacts R1, R2. Any current now supplied by the battery to the motor will, insofar as the field winding 42 is concerned, tend to rotate the armature in a direction opposite to that in which it is rotating. However, in that the motor armature is still rotating in the forward direction due to the inertial effects of the system, the generated voltage by the armature will now be reversed; i.e., positive at the bottom terminal of the armature 40. With the generated voltage of the armature 40 positive at the lower terminal, a series combination of diode 90 and resistor 94 essentially short-circuits the generated voltage and the current due to the generated voltage circulates in the loop comprising the armature 40, diode 90 and resistor 94 and be limited by the respective resistances of those three elements.

The plugging circuit 86 performs two functions. The first of these functions is to inhibit the oscillator within the pulse generator 60 during that period of time in which the armature current exceeds a predetermined or desired value so as to preclude a regenerative effect in which the armature current might increase in an uncontrolled fashion and result in an erratic braking action. The second function of the plugging circuit 86 is to provide an input signal to the inhibit circuit 62 (FIG. 2) the output of which inhibits the firing of thyristor 48 and places the chopper circuit of the present invention into its low power mode of operation.

To achieve these functions, the reverse voltage across the armature, indicating the desired plugging action, is sensed and applied via leads 75 and 77 to the plugging circuit 86. Referencing now FIG. 3 which shows the circuit 86 in detail, lead 77 is connected to one side of the resistor 140, the other side of which is connected to and forms an input to the anode of a rectifier (diode) 142. The output of diode 142 forms one input to a variable resistor 144, the other side of which is connected via line 72 to the resistor 114 in the pulse generator 60. The output of diode 142 also forms the base input to a transistor 146 having its collector connected to a resistor 148, the other end of which is connected via a diode 73 and line 74 to the base of transistor 104 of the relaxation oscillator of the pulse generator 60. The emitter of transistor 146 forms an input to a resistor 150, the output of which is connected to the cathode of a rectifier or diode 152, the anode of which is connected via line 75 to the other armature terminal. Transistor 146 adjusts the current in that circuit segment which extends from the upper terminal of armature 40 via line 77 through resistor 140, diode 142 and resistor 144 to resistor 114 in the pulse generator 60. Because the voltage at the upper terminal of resistor 114 is a fixed voltage and because the battery voltage is also fixed, the voltage between the positive bus and the lower end of resistor 144 is a fixed value. By adjusting the value of the resistance 144, the voltage across resistor 140 can be adjusted which in turn presets the voltage on the base of transistor 146 to a predetermined level. This voltage is set at a level which will allow the emitter to base circuit to become forward-biased when the voltage at the lower terminal of the armature 40 is at a proper level with respect to voltage at the upper terminal of the aramture; that is, when the voltage across the armature divided by the total resistance of the circuit loop of armature, diode 90 and resistor 92 equals the desired current.

When the desired current level is reached, the voltage at the lower terminal of armature 40 is more positive than that at the base of transistor 146 and current flows through diode 152, resistor 150, and through the emitter to base circuit of transistor 146, turning that transistor on. With the turning on of transistor 146, the voltage at the lower terminal of armature 40 (less the voltage drop due to the diode 152, resistor 150 and resistor 148) is applied through an isolation diode 73 to the base of transistor 104 at the relaxation oscillator portion of the pulse generator 60. Resistors 150 and 148 are chosen with respect to resistor 112 of the pulse generator 60 such that the base of transistor 104 is made more positive than the emitter and, therefore, while transistor 146 is conducting transistor 104 cannot conduct. Thus, no current will be supplied to capacitor 106 in the relaxation oscillator preventing its voltage from increasing which in turn prevents the unijunction transistor 110 from producing a gating pulse. At this time, therefore, no additional battery power can be supplied to the motor. When the armature current reduces to the desired level, the inhibiting of the pulse generator will cease and the relaxation oscillator of the pulse generator once again begins the generation of gating pulses.

Figure 4:
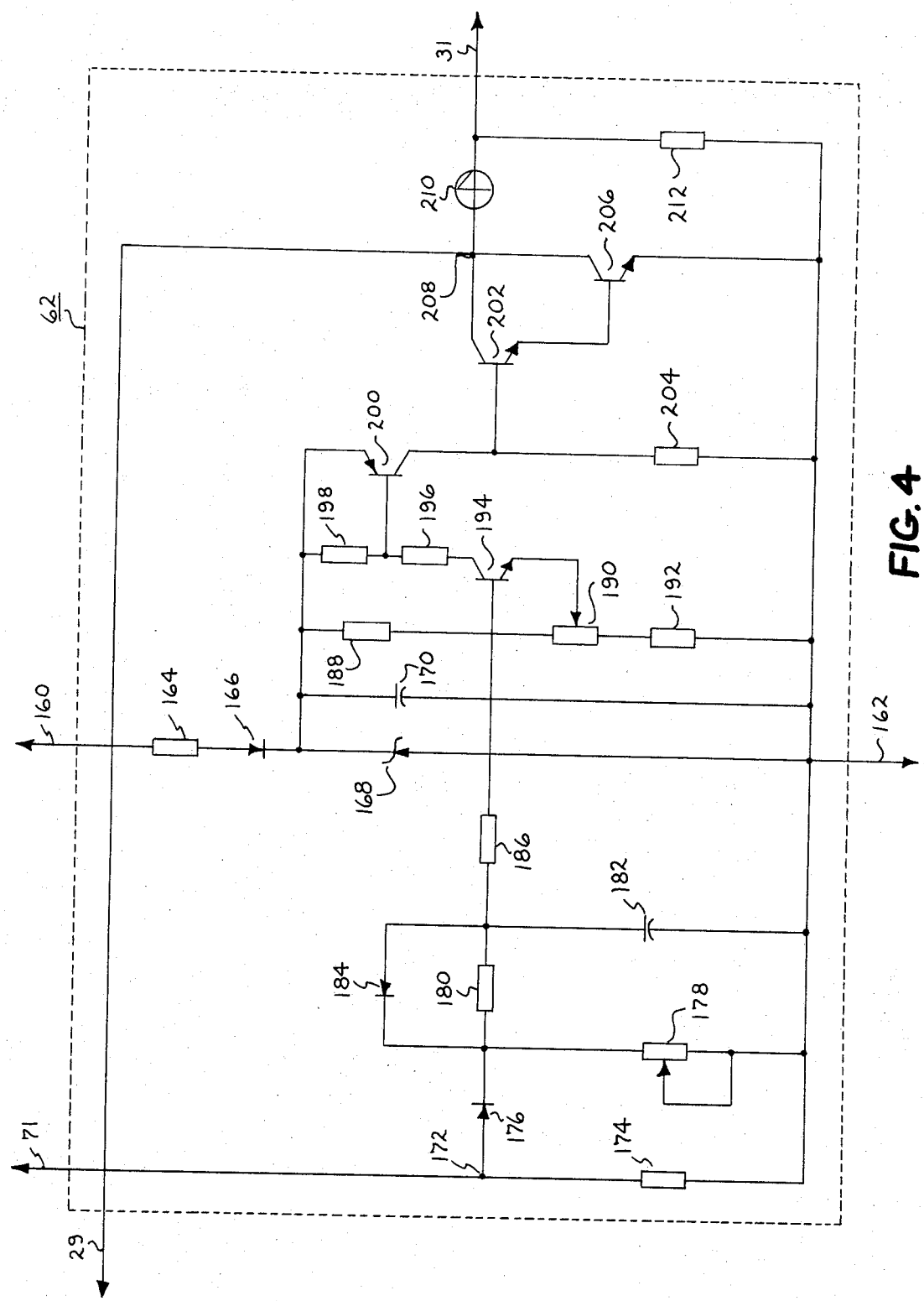

However, as will be remembered from earlier descriptions and as is illustrated best in FIG. 2, the signal from the plugging circuit 86 appearing on line 71 is also applied to the inhibit circuit 62, the details of which are illustrated in FIG. 4.

Referencing now FIG. 4, it is seen that power is supplied to the inhibit circuit 62 by a connection 162 to the negative bus 13 and a connection 160, resistor 24 and diode 22 to the positive bus 11 (FIG. 2). A positive voltage is supplied to the inhibit circuit by way of a resistor 164 which is in series with a diode 166 and a parallel connection of a Zener diode 168 and a capacitor 170 which collectively form a constant voltage bus for the circuit 62.

Initially, input point 172 of circuit 62 is at a negative value by virtue of its connection to the negative bus through a resistor 174. When, however, the system is in the plugging mode and the armature current exceeds the predetermined value as hereinbefore explained a positive signal appears at point 172 via line 71 from the plugging circuit 86. This positive signal is applied by way of a diode 176 to what is essentially an integrating network comprising a variable resistor 178 connected in parallel, to the negative bus, with a series combination of a resistor 180 and a capacitor 182. This signal then will charge capacitor 182 (positive to top plate) to a value at a rate which is the function of either; (a) the time of a single pulse, or (b) the ratio of pulse time to total time in the case of a train of pulses. A discharge path for capacitor 182 is provided through a diode 184 in parallel with resistor 180, and the resistor 178. If the signal applied at point 172 is a constant value, this discharge path is ineffective. If, however, the signal at point 172 is a train of pulses, signifying that the armature current is fluctuating around the predetermined value previously described, the setting of the variable resistor 178 will govern the point at which the rest of the circuit 62 becomes operative as will be described.

When capacitor 182 charges to a value, as seen through a dropping resistor 186, exceeding base voltage of a transistor 194, transistor 194 conducts as determined by the bridge of resistors 188, 190, and 192. With transistor 194 conducting, its collector current through a resistor bridge 196 and 198 will lower the base voltage of a transistor 200 such that transistor begins conduction. The collector of transistor 200 is connected to the base of transistor 202 and to the negative bus by a resistor 204. Collector current from transistor 200 will raise the base voltage of transistor 202 rendering it conductive. One additional transistor 206 is connected with its base connected to the emitter of transistor 202 such that the conduction of the latter will effect condition of transistor 206.

The collectors of the two transistors are con-nected to a junction point 208 to which is also connected line 29 from the pulse generator 60 and one side of an unilateral switch 210. The other side of switch 210 is connected to the negative bus through a leakage resistor 212 and to line 31 which connects to the gate 49 of thyristor 48 (FIG. 2). As such, when transistor 206 is in the conducting state, point 208 is held to a value insufficient to allow the unilateral switch 210 to conduct. Thus, even though a signal is present on line 29, which signal would normally fire thyristor 48, this signal is inhibited and thyristor 48 is prevented from conducting.

Even though thyristor 48 is inhibited, the pulse generator 60 will continue to issue gating pulses in accordance with the previous discussion. The gating pulses thus issued will render the thyristor 20 (FIGS. 1 and 2) conductive and power will be delivered from the battery to the motor in the low power mode by way of thyristor 14 in the manner described with respect to FIG. 1. Thus, it is seen that there has been described a power control circuit which utilizes a minimum number of components and yet efficiently operates in a high and a low power mode. It has been further shown how this invention is particularly applicable to the control of a DC motor to provide for smooth operation thereof, in both the traction and the plugging mode. It is, of course, to be realized that the motor load with plugging was used as an illustrative example only and that the present invention has general applicability. For example, in the system of FIG. 2 the low power mode of operation could be applied to the motor for low speed, light load operation merely by maintaining the armature and field windings in proper relationship and by inhibiting the firing of thyristor 48 by suitable means.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. A control circuit for varying the amount of power delivered from a source of power to a load by varying the percentage of time the load is connected to the source comprising:
   a. a single power circuit for coupling the source to the load including a first switching device, a second switching device, and an inductor coupled in series circuit relationship;
   b. a capacitor coupled in parallel circuit relationship with the series combination of said second switching device and said inductor, said second switching device and said inductor comprising a charge reversing circuit for reversing the charge on said capacitor at a selected frequency; and
   c. means responsive to the reversal of the capacitor charge to render said first switching device conductive whereby the power is delivered from the source to the load through said capacitor.

2. The invention in accordance with claim 1 wherein said first and said second switching devices are controlled rectifiers.

3. The invention in accordance with claim 2 wherein said charge reversing circuit includes oscillator means for rendering said second controlled rectifier conductive to reverse the charge on the capacitor.

4. The invention in accordance with claim 3 where the charge on the capacitor selectively serves to place both of said controlled rectifiers into a nonconductive state.

5. A control circuit for varying the amount of power delivered from a source of power to a load by varying the percentage of time the load is connected to the source comprising:
   a. first and second switching means selectively operable in a first mode of operation to control the amount of power supplied to said load from said source;
   b. means to selectively render said first and said second switching means conductive;
   c. commutating means in circuit with said first and second switching means to render said switching means non-conductive; and,
   d. means to inhibit the rendering of said first switching means conductive in a second mode of operation whereby power is supplied to said load through said second switching means.

6. The invention in accordance with claim 5 wherein said first and second switching means are controlled rectifiers.

7. The invention in accordance with claim 6 wherein the means to selectively render the first and second controlled rectifiers conductive includes a variable frequency oscillator.

8. The invention in accordance with claim 6 wherein said commutating means includes a capacitor controlably chargeable in first and second directions to render, respectively said first and second controlled rectifiers nonconductive.

9. The invention in accordance with claim 7 wherein the means to inhibit includes an inhibit circuit disposed intermediate said oscillator and said first controlled rectifier whereby signals from said oscillator are prevented from reaching the first controlled rectifier.

10. A circuit for controlling the amount of power delivered to a load from a direct current power source comprising:
    a. a first controlled rectifier in series with said load and said source, said rectifier alternately changed between a conductive and a non-conductive state to thereby control the effective power applied to said load in a first mode of circuit operation;
    b. a storage means for the retention of a quantum of electrical energy in communication with said source whereby said storage means is electrically charged in a first direction;
    c. a reversing circuit loop, independent of said first controlled rectifier whereby said storage means may electrically charge in a second direction opposite to that first specified;
    d. a second controlled rectifier, alternately changed from a conductive to a nonconductive state, connected in series with said load and said source and in parallel with said first controlled rectifier, said second controlled rectifier acting in said first mode of circuit operation to apply the second direction charge on said storage means to said first controlled rectifier to render that rectifier nonconductive; and,
    e. means to effect a second mode of circuit operation including means to inhibit the first controlled rectifier from the conductive state while permitting the second controlled rectifier to conduct whereby power is supplied from said source to said load through said second controlled rectifier.

11. The invention in accordance with claim 10 wherein said load is a direct current motor.

12. The invention in accordance with claim 10 wherein said storage means is a capacitor.

13. The invention in accordance with claim 12 wherein the capacitor is in series with said second controlled rectifier and in parallel with said first controlled rectifier.

14. A control circuit for controlling the amount of power supplied to a load comprising:
   a. a main power circuit including a battery, the load, a transformer primary winding and a first thyristor all in series;
   b. a source of variable frequency pulses for supplying signals to said first thyristor whereby said thyristor may switch from a blocking to a conducting state;
   c. a second power circuit comprising a series arrangement of a second thyristor and a commutating capacitor, said second power circuit connected in parallel with said first thyristor;
   d. means for charging said capacitor in a first direction;
   e. a reversing circuit including a transformer secondary and a third thyristor in series with said secondary, said reversing circuit connected in parallel with said capacitor;
   f. means connecting said source with said third thyristor whereby pulses derived from said source may render said third thyristor conductive to effect the charging of said capacitor in a second direction opposite to that first imposed;
   g. sensing means responsive to a prescribed voltage across said transformer secondary to produce a signal to switch said second thyristor into a conductive state completing a circuit loop comprising said first and second thyristors and said capacitor whereby the second direction charge on said capacitor serves to render said first thyristor nonconductive to effect a first mode of control circuit operation; and,
   h. means to inhibit the rendering of said first thyristor conductive to effect a second mode of control circuit operation in which power is delivered to said load from said battery through said second thyristor.

15. The invention in accordance with claim 14 wherein said load is a direct current motor.

* * * * *